Dec. 11, 1923.
T. BROWN
1,476,687
MOTOR CULTIVATOR
Filed July 3, 1917
3 Sheets-Sheet 3
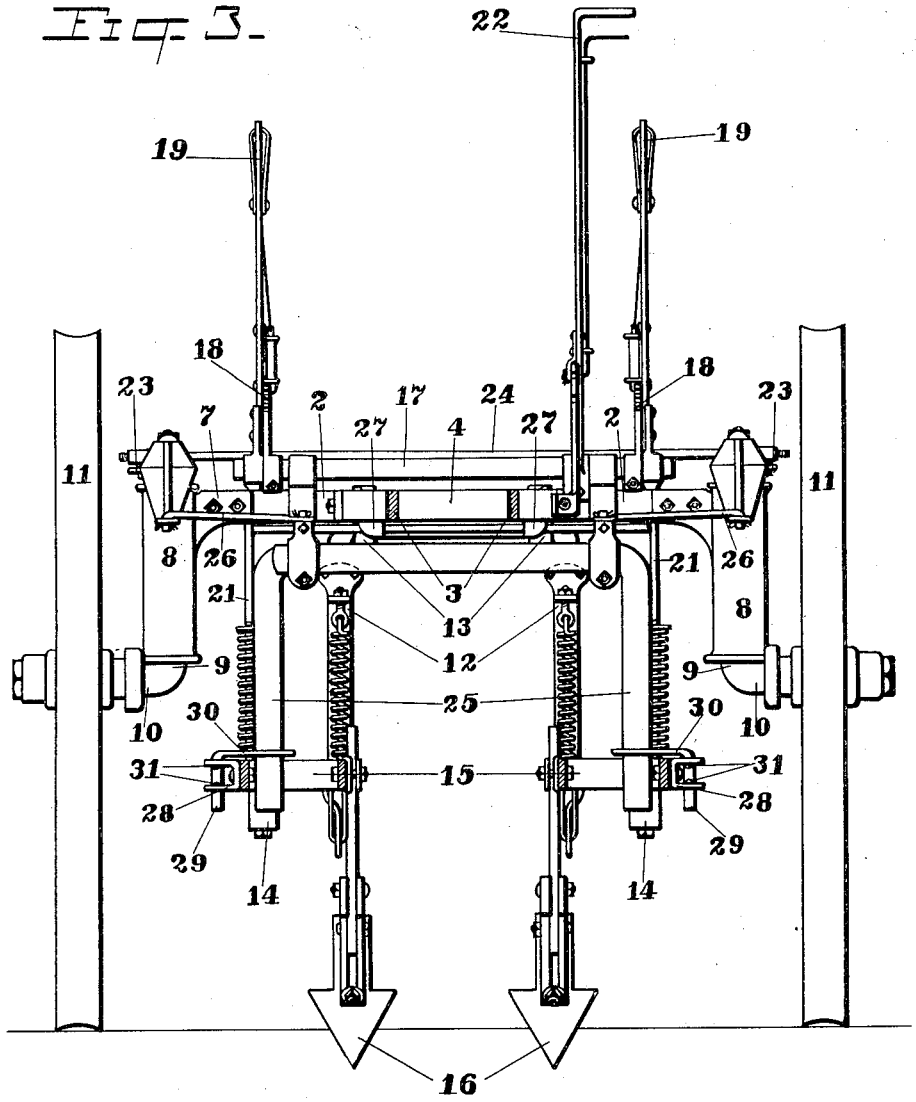

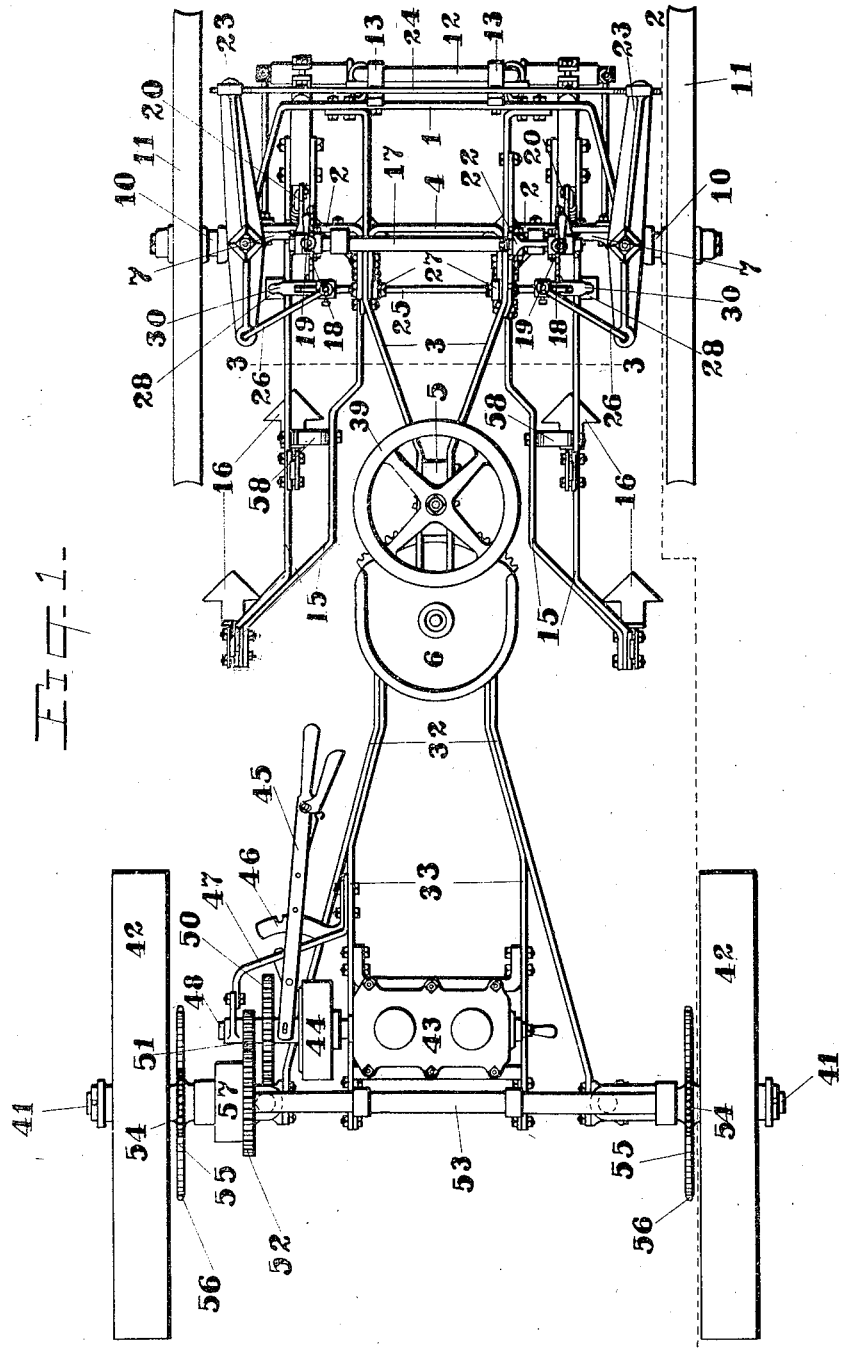

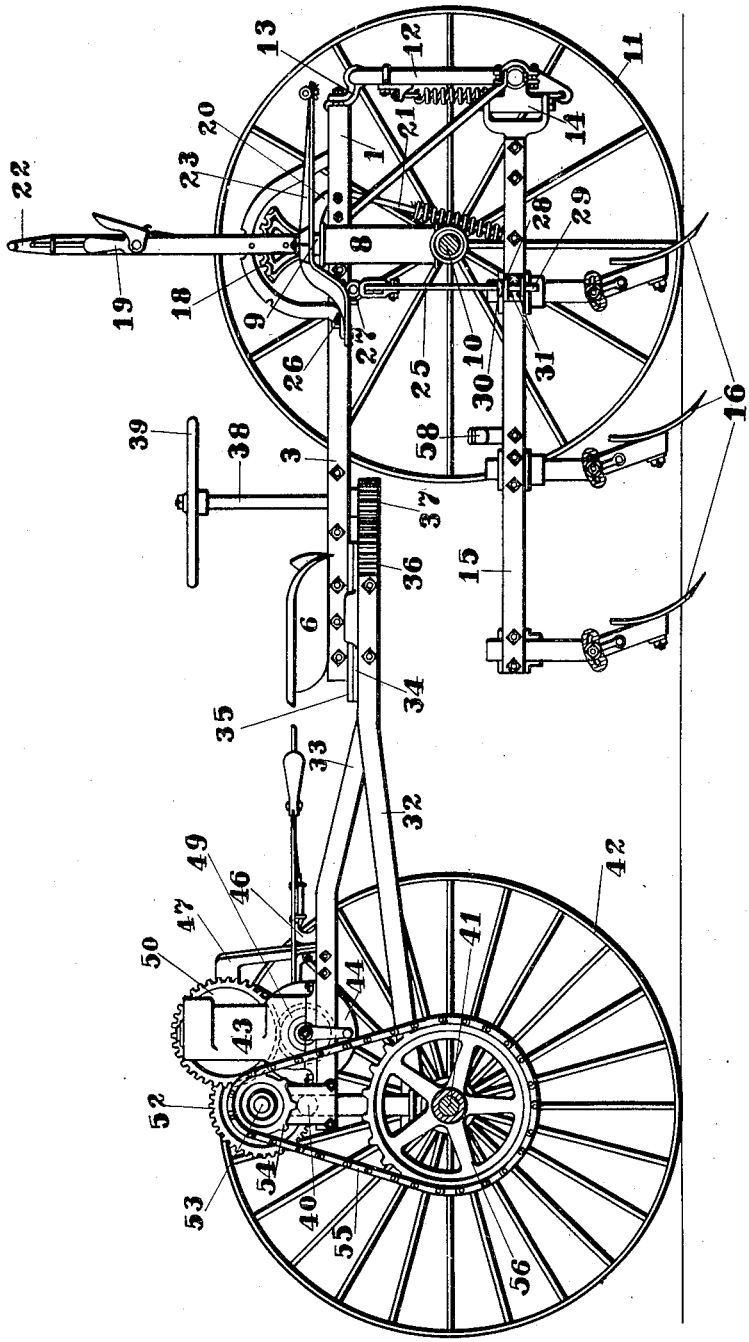

Patented Dec. 11, 1923.

1,476,687

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

MOTOR CULTIVATOR.

Application filed July 3, 1917. Serial No. 178,389.

*To all whom it may concern:*

Be it known that I, THEOPHILUS BROWN, a citizen of the United States, residing at Moline, in the county of Rock Island and State of Illinois, have invented certain new and useful Improvements in Motor Cultivators, of which the following is a specification, reference being had therein to the accompanying drawing.

My invention relates to agricultural machinery in this instance a tillage implement, which is adapted to be propelled by power connected thereto, and to be dirigible by mechanism controlled by the operator.

The object of my invention is to provide an implement combining a cultivator element and a tractor element pivotally connected to the rear of the cultivator element, and including means by which each element can be steered when in operation between rows of growing plants presenting irregularity of alinement, or for turning the implement at the ends of rows or during progress from place to place.

Referring to the drawings in which similar numerals indicate identical parts—

Figure 1 is a plan view of a power propelled cultivator embodying my improvements.

Figure 2 is a section in elevation on line 2—2 of Figure 1, and

Figure 3 is a rear view of the cultivator in section on the line 3—3 of Figure 1.

The cultivator frame is composed of a front bar 1 with its ends bent to extend rearwardly and secured to bars 2, the inner ends of the latter are also bent rearwardly. A seat support comprises bars 3 which are bolted to the bar 1 and extend rearwardly in parallelism with the inner bent ends of the bars 2 between which and a brace bar 4 they are securely bolted; from this point the bars 3 converge rearwardly to a block 5 and are rigidly bolted to the opposite sides thereof, and on their termination is mounted a seat 6.

Rigidly secured to the bars 2 are brackets 7 having vertical bearings 8 in which are journaled to rotate spindles 9, the lower ends of the latter being bent outwardly to form axles 10 on which are mounted supporting wheels 11.

An arch 12 is supported in bearings 13 on the frame bar 1; the ends of the arch 12 extend laterally for the reception of couplings 14, of a well known type, to which are connected gang beams 15, carrying cultivating devices 16, in this instance shovels. The couplings 14 permit both a vertical and lateral swing of the gangs. Levers 19 are mounted on the frame and are provided with the usual type of latch to engage with notched segments 18 on the ends of a rock shaft 17 mounted in bearings on the cultivator frame. The levers 19 are provided with forwardly projecting arms 20 from which depend links 21 connected at their lower ends to the gang beams 15, so that either of the gang beams can be raised out of operation when desired; when it is necessary to raise them both at once I operate a master lever 22 which is connected to the rock shaft in a well known manner.

Arms 23 are rigidly secured between their ends on the upper ends of the spindles 9, and are connected forwardly by a rod 24. The rear ends of the arms 23 are connected to the spread arch 25 by links 26, the arch 25 being slidably supported in bearings 27 secured on the brace bar 4. Brackets 28 are secured on the gang beams 15, and have upper and lower parallel arms which are perforated for the proper reception of the vertical portions 29 of members 30; the vertical portions 29 are free to rotate but are prevented from moving vertically by pins or cotters 31. The upper portion of the members 30 extend laterally and are slotted to loosely embrace the legs of the arch 25; by this construction the beams are free to rise on the arch 25 when the levers 19 and 22 are operated, and at the same time the connections of the arch with the beams is sufficiently flexible to prevent binding when the latter are swung laterally, the beams swinging simultaneously and having a constant parallel relation with each other and with the dirigible wheels.

The cultivator is propelled by a tractor including a frame composed of bars 32 which converge forwardly, and bars 33 which also converge forwardly and, with the bars 32, are rigidly secured to a member 34 pivotally connected to a member 35 to which the rear ends of the seat support are bolted. Preferably integral with the member 34 is an arcuate rack 36 with which a pinion 37 meshes, the latter being secured on a vertical shaft 38 rotatable in a suitable bearing in the block 5. A hand wheel 39 is mounted on the upper end of the shaft 38. The parts just described constitute the pivotal connection of the tractor with the cultivator, and the means by which the turning of the latter from a direct line of progress can be accelerated, and is more fully described in detail in my pending application filed September 28, 1916, Serial No. 122,713.

The rear ends of the bars 32 are rigidly secured to the vertical parts of an arched axle 40, the ends of which form spindles 41 upon which are mounted the traction ground wheels 42. The bars 33 are secured by suitable means to the upper part of the arch, and upon them I mount a motor 43, the flywheel 44 of which forms part of a friction clutch. A hand lever 45 controls the second element of the friction clutch, the lever being provided with the usual type of latch to engage with a notched segment 46 secured on a bracket 47. The bracket 47 supports the outer end of the motor shaft 48; a pinion 49 is mounted on the motor shaft and is actuated by the shaft when the clutch is closed. The pinion 49 meshes with a gear 50 on a shaft above the motor shaft; the gear 50 or its shaft carriers a pinion 51 which engages with a gear 52 mounted on a cross shaft 53 journaled in suitable bearings on the upper part of the arched axle 40. The cross shaft has rigidly mounted on the ends thereof, sprocket wheels 54 which are connected by chains 55 with sprocket wheels 56 on the traction wheels 42.

I provide, on the cross shaft 53 a compensating or differential gear 57, which is interposed between the pinion 51 and the sprocket wheels 54, so that power transmitted to the gear 52 will be imparted to the traction wheels 42 equally but with differential speeds, as circumstances may require.

In the operation of my machine the motor is first started by operation of the lever 45. If the rows to be cultivated deviate only from a straight line at intervals, the operator causes the machine to be deflected to the required degree by lateral pressure upon treadles 58 on the beam 15; swinging the beams 15 laterally cause a lateral movement of the spreader arch 25 and as the arch is connected to the rearward extension of the arms 23 the latter are swung, and through their connection with each other by the rod 24 the wheels 11 are simultaneously moved to travel on lines approximately parallel to the longitudinal lines of beams.

The extent to which the operator can steer the front wheels by swinging the beams 15 is necessarily limited, but he can still further angulate the wheels by operation of the steering wheel 39 by which the tractor and cultivator are brought to a greater angle with each other, consequently the machine can be made to turn on short curves, as when making a turn at the end of a row, or when moving from place to place.

Heretofore, in a cultivating apparatus of this class comprising a pushing power element at the rear, and a cultivator-carrying element at the front, the gang frames, or rigs, have been so arranged that they moved laterally, when shifted, in parallelism to the path of the machine, irrespective of the lines followed by the wheels. When the latter were running on lines inclined to the normal path, the tool-rigs, or gang beams, were angulated in relation to the wheels. Under many circumstances it is desirable to have the longitudinal lines of the gang beams maintained in vertical planes approximately parallel to the planes of the wheels which are transverse to the axis. In the present construction it will be seen that as the rear end of either gang beam, or rig-bars, swings laterally, it is kept in constant parallelism with the wheels.

With such a mechanism the wheel is not carried so far from its normal line of advance when the beam is swung outward. If a plant should be a few inches from the normal line of its row, say to the right, the operator throws the rear end of the righthand beam a corresponding distance toward the right just as the front shovel 16 approaches the plant. As soon as the shovels are moved laterally the wheel begins to roll a short distance toward the row, which latter is, normally, from eighteen to twenty-four inches distant. Immediately after the shovels pass the stray plant the operator brings the beam to the normal line, or slightly beyond it, and the wheel is turned so as to restore itself to its normal line of travel, as are also the beam and shovels.

What I claim is—

1. A power propelled tillage implement having in combination a front frame, one or more dirigible wheels supporting said frame, a plurality of gangs of cultivating devices held in constant parallelism with each other on the said frame and with the paths of the wheels and adapted to be optionally swung laterally, a second frame adjustably connected to the rear of the cultivator frame, means for angularly adjusting said frames for steering the implement, power-driven frame-pushing devices mounted on the second frame and engaging with the ground at a transverse line in the rear of the said dirigible wheels and of the cultivating devices, and means connecting the dirigible wheels and the gangs, whereby, when the gangs are being pushed from the rear and are being shifted laterally the dirigible wheels are simultaneously steered.

2. In an apparatus of the class described, the combination of a front frame, dirigible wheels supporting said frame, a plurality of gangs of cultivating devices held in constant parallelism with each other on the said frame and with the paths of the wheels and adapted to be optionally swung laterally relatively to the frame, a second frame connected to the rear of the cultivator frame and adapted to be adjusted angularly in relation thereto, means for so adjusting said frame to steer the apparatus, power-driven frame-pushing devices mounted on the second frame and engaging with the ground on a transverse line in the rear of the dirigible wheels and of the cultivating devices, an initial power-receiving device for shifting the gangs laterally and connected to the dirigible wheels for simultaneously steering said wheels while the gangs and wheels are being pushed from the rear.

3. In an apparatus of the class described, the combination of a front frame, dirigible wheels supporting said frame, means for optionally turning said wheels for steering, a plurality of gangs of cultivating devices on the said frame adapted to be optionally swung laterally relatively thereto around vertical axes and constantly held approximately parallel to the paths of said wheels, a second frame, means for connecting the second frame to the rear of the cultivator frame and adapted to steer the second frame independently of the steering action of the aforesaid dirigible wheels, power-driven frame-pushing devices mounted on the second frame and engaging with the ground at a transverse line in the rear of the dirigible wheels, and means connecting the gangs to the dirigible wheels whereby, when the cultivating devices are being pushed from the rear and simultaneously shifted laterally, the dirigible wheels are also simultaneously steered.

4. An apparatus of the class described, having in combination a cultivator, dirigible wheels supporting the cultivator, gangs of cultivating devices adapted to be swung laterally in unison around vertical axes, a second frame pivotally connected to the rear of the cultivator, means for controlling the pivotal relationship of the frames, power-driven frame-pushing devices mounted on the second frame and engaging with the ground at a transverse line in the rear of the said dirigible wheels, means for optionally shifting the gangs laterally and simultaneously turning the dirigible wheels to travel on lines approximately parallel to the longitudinal lines of the gangs, and supplemental means for optionally steering the second frame and the power-driven ground-engaging devices.

5. In a cultivating mechanism of the class described, the combination of a frame, dirigible wheels connected to and supporting the frame, tool gangs connected to the frame and adapted to swing laterally in relation thereto around vertical hinges, power devices for propelling said frame, gangs and wheels, and means connecting the tool gangs and the wheels for swinging the gangs laterally and simultaneously swinging the wheels to maintain constantly an approximate parallelism of the paths of the wheels and the paths of the tools, and means for steering said mechanism independently of said gangs.

In testimony whereof I affix my signature in presence of two witnesses.

THEOPHILUS BROWN.

Witnesses:
 JESSIE SIMSER,
 W. G. DUFFIELD.